United States Patent
Zhang

(10) Patent No.: US 12,007,927 B2
(45) Date of Patent: Jun. 11, 2024

(54) VIRTUALIZED SoC BUS SYSTEM AND CONFIGURATION METHOD

(71) Applicant: NANJING SEMIDRIVE TECHNOLOGY CO. LTD., Jiangsu (CN)

(72) Inventor: Lihang Zhang, Shanghai (CN)

(73) Assignee: NANJING SEMIDRIVE TECHNOLOGY CO. LTD., Nanjing (CN)

( * ) Notice: Subject to any disclaimer, the term of this patent is extended or adjusted under 35 U.S.C. 154(b) by 39 days.

(21) Appl. No.: 17/635,006

(22) PCT Filed: Aug. 5, 2020

(86) PCT No.: PCT/CN2020/106968
§ 371 (c)(1),
(2) Date: Feb. 14, 2022

(87) PCT Pub. No.: WO2021/027643
PCT Pub. Date: Feb. 18, 2021

(65) Prior Publication Data
US 2022/0292040 A1    Sep. 15, 2022

(30) Foreign Application Priority Data
Aug. 13, 2019   (CN) .......................... 201910743379.8

(51) Int. Cl.
*G06F 13/40* (2006.01)
*G06F 9/455* (2018.01)

(52) U.S. Cl.
CPC ...... *G06F 13/4022* (2013.01); *G06F 9/45533* (2013.01)

(58) Field of Classification Search
CPC ............. G06F 13/4022; G06F 13/4027; G06F 9/45533; G06F 13/4068; G06F 16/1827;
(Continued)

(56) References Cited

U.S. PATENT DOCUMENTS

| 10,091,295 | B1 * | 10/2018 | Savic ...................... G06F 16/25 |
| 2003/0204650 | A1 | 10/2003 | Ganasan et al. |
| 2014/0115273 | A1 | 4/2014 | Chirca et al. |

FOREIGN PATENT DOCUMENTS

| CN | 101383712 | 3/2009 |
| CN | 204925656 | 12/2015 |
| CN | 110532062 | 12/2019 |

* cited by examiner

*Primary Examiner* — Ernest Unelus
(74) *Attorney, Agent, or Firm* — ANOVA LAW GROUP, PLLC

(57) ABSTRACT

A virtualized SoC bus system comprises a plurality of distributor modules, a plurality of system exchanger modules, and a plurality of arbiter modules, wherein the distributor modules distribute data requests sent by hosts to different system exchanger modules, the system exchanger modules analyze the data requests of the hosts and distribute the data requests to different arbiter modules according to analysis results, and each arbiter module pools the data requests sent by the plurality of system exchanger modules to an output interface and sends same to a device to which the arbiter module is connected. The present invention further provides a configuration method for the virtualized SoC bus system. The execution efficiency of virtual machines in the virtualized system can be improved, and reliable bus isolation is provided for the virtual machines, so that the mutual interference among the virtual machines is reduced, and the stability of the system is improved.

11 Claims, 2 Drawing Sheets

(58) Field of Classification Search
CPC . G06F 16/25; H04L 41/0668; H04L 67/1001; H04L 67/1097
See application file for complete search history.

VIRTUALIZED SoC BUS SYSTEM AND CONFIGURATION METHOD

TECHNICAL FIELD

The examples of the present invention relate to the technical field of system on chip (SoC), in particular to a virtualized SoC bus.

BACKGROUND ART

At present, virtualization technology has found an increasingly wide application in system on chip (SoC) and microcontroller. A remarkable feature of a virtualization system is to dynamically allocate limited system resources among subsystems (virtual machines) according to different application scenarios, so as to maximize the utilization rate of system hardware resources.

The benefits brought by virtualization technology are obvious. However, in actual applications, the problems brought by virtualization, such as reduced system efficiency and mutual interference among virtual machines, are more and more serious, and have become urgent problems to be solved. Change of the architecture of the system bus has become the key to solve the above two kinds of problems. The traditional system bus employs a single-network full-interconnection structure to interconnect all hosts (master) and devices (slave) in the system via a series of switches. Since all hosts and devices shame the unitary bus resource, the path flour an host to device is unique.

The traditional system bus structure has the following technical defects:

It is impossible for the access from the host to device among different virtual machines to avoid the interference from the data access of other virtual machines.

Since all virtual machines share the unitary bus resource, the bus bandwidth resource available to each virtual machine decreases significantly as the number of virtual machines increases.

Contents of the Invention

To overcome the drawbacks in the prior art, the present invention provides a virtualized SoC bus system and a configuration method, which can improve the execution efficiency of each virtual machine in a virtualization system and provide reliable bus isolation among the virtual machines, thereby reduce the mutual interference among the virtual machines.

To attain the above object, at least one example of the present invention provides a virtualized SOC bus system, which comprises a plurality of distributor modules, a plurality of system switch modules, and a plurality of arbiter modules, wherein, the distributor modules distribute data requests sent by hosts to different system switch modules;

the system switch modules analyze the data requests of hosts and distribute the data requests to different arbiter modules according to the analysis results;

the arbiter modules pool the data requests sent by the plurality of system switch modules to an output interface and send them to the devices connected with the output interface.

Furthermore, the distributor modules distribute the data requests according to the following rules:

distribute data request of a host to a fixed system switch module, if the host exclusively belongs to a virtual machine in an application;

distribute different data requests to different system switch modules according to the virtual machine index (ID) of the current data request of a host, if the host is a virtualized device and serves different virtual machines at the same time in an application.

Furthermore, the distributor modules maintain data consistency among the data requests when data requests of hosts are distributed to different system switch modules.

Furthermore, the plurality of system switch modules form a topological structure of virtualized bus, and each system switch module interconnects all hosts and devices or interconnects partial hosts and devices according to system requirements.

Furthermore, the arbiter module further comprises a firewall, which prevents the virtual machine from accessing the current device based on the ID of the currently accessing virtual machine, the read/write type of the access, whether the access is secure or whether the access is in a privileged mode.

Furthermore, the arbiter module further comprises a flow controller for controlling the system flow; the flow control policies include: free of flow control, if the device exclusively belongs to a virtual machine; assigning bandwidth resource for each virtual machine according to the system settings, if the device is a virtualized device and serves a plurality of virtual machines.

To attain the above object, at least one example of the present invention further provides a configuration method of a virtualized SoC bus system, which comprises the following steps:

assigning system switch module resource for each virtual machine;

configuring routing of sending terminal for each distributor module according to the status of the virtual machines served by the host;

setting firewall and flow controller of each arbiter according to the status of the virtual machines served by each device.

Furthermore, the step of setting firewall of each arbiter according to the status of the virtual machines served by each device is to set the firewall based on the ID of the currently accessing virtual machine, the read/write type of the access, whether the access is secure or whether the access is in a privileged mode.

Furthermore, the step of setting flow controller of each arbiter according to the status of the virtual machines served by each device is based on the following policies:

free of flow control, if the device exclusively belongs to a virtual machine;

assigning bandwidth resource for each virtual machine according to the system settings, if the device is a virtualized device and serves a plurality of virtual machines.

To attain the above object, at least one example of the present invention provides a computer readable storage medium having a program stored thereon, wherein the program can be executed by a processor to perform the steps of the above-mentioned configuration method of a virtualized SoC bus system.

The virtualized SoC bus system and the configuration method of the present invention realize the virtualization of a plurality of buses of a SoC, and solve the problem of data transmission between virtualized hosts and virtualized devices in a SoC; and can improve the execution efficiency of each virtual machine in the virtualization system, and provide reliable bus isolation among the virtual machines, thereby reduce the mutual interference among the virtual machines and improve the stability of the system.

Other features and advantages of the present invention will be detailed in the following description and become apparent partially from the description, or will be understood through implementation of the present invention.

DESCRIPTION OF DRAWINGS

The accompanying drawings are provided to help further understanding of the present invention, and constitute a part of the description. These drawings are used in conjunction with the content of the present invention and the examples to interpret the present invention, but don't constitute any limitation to the present invention. In the figures.

EMBODIMENTS

Hereunder some preferred examples of the present invention will be described, with reference to the accompanying drawings. It should be understood that the embodiments described here are only provided to describe and interpret the present invention, but don't constitute any limitation to the present invention.

The steps shown in the flow chart in the accompanying drawings may be executed in a computer system, such as a set of computer executable instructions. Moreover, although a logic sequence is shown in the flow chart, the illustrated or described steps may be executed in a sequence different from the sequence illustrated here in certain case.

In the examples of the present invention, the virtualized SoC bus provides a hardware-virtualization bus support for the virtualized SoC and the microcontrollers, so that the execution efficiency of each virtual machine in the virtualization system can be improved. Besides, it provides reliable bus isolation among the virtual machines to reduce the mutual interference among the virtual machines.

Example 1

Figure 1:
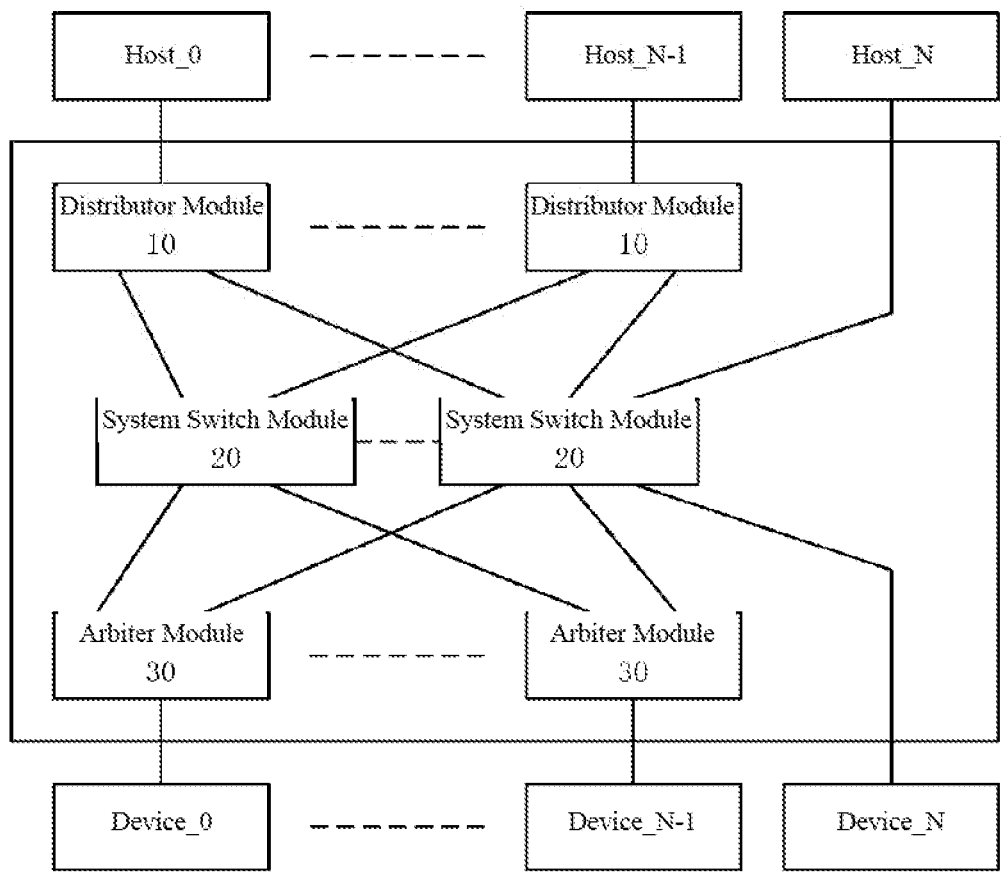
FIG. 1 is a block diagram of the structure of the virtualized SoC bus system according to the present invention.

FIG. 1 is a block diagram of the structure of the virtualized SoC bus system according to the present invention. As shown in FIG. 1, the virtualized SoC bus system of the present invention comprises a plurality of distributor modules 10, a plurality of system switch modules 20 and a plurality of arbiter modules 30, wherein, The distributor module 10 has a single-input and multi-output structure, and its input terminal is connected with a host (master), while its output terminals are connected with one or more system switch modules 20. It distributes the data requests received from hosts to different system switch modules 20 and maintains consistency among the data requests distributed to different switch modules.

In an example of the present invention, the distributor module 10 distributes the data requests received from hosts to different system switch modules according to the following rules:

1) distribute the data request of a host to a fixed system switch module, if the host exclusively belongs to a virtual machine (VM) it an application; for example, if the host belongs to a virtual machine VM0, the distributor module 10 distributes the data request from the host to a fixed system switch module MainSwitch0;

2) distribute different data requests to different system switch modules according to the virtual machine ID of the current data request of a host, if the host is a virtualized device and serves different virtual machines at the same time in an application.

In an example of the present invention, in the case that the data requests of hosts are distributed to different system switch modules by the distributor module 10, the distributor module 10 maintains data consistency among the data requests.

The system switch modules 20 are connected with the distributor modules 10 and the arbiter modules 30 respectively, analyze data requests of hosts, and distribute the data requests to different arbiter modules 30 according to the analysis results.

In an example of the present invention, the plurality of system switch modules 20 can form a topological structure of virtualized bus, and each system switch module 20 can interconnect all hosts and devices, or each system switch module 20 can interconnect some hosts and devices, according to the actual requirements of the system.

The arbiter module 30 has a multi-input and single-output structure, and it pools the data requests sent by the plurality of system switch modules 20 to a single output interface connected with the devices.

In an example of the present invention, the arbiter module 30 comprises a firewall, which provides a firewall function and prevents some virtual machines from accessing the current device according to the system configuration. The access authority control may be based on the ID of the currently accessing virtual machine, the read/write type of the access, whether the access is secure or whether the access is in a privileged mode.

In an example of the present invention, the arbiter module 30 further comprises a flow controller that provides a flow control function. The flow control policies include: free of flow control, if the device exclusively belongs to a virtual machine; assigning the bandwidth resource for each virtual machine according to the system settings, if the device is a virtualized device and serves a plurality of virtual machines.

Example 2

Figure 2:
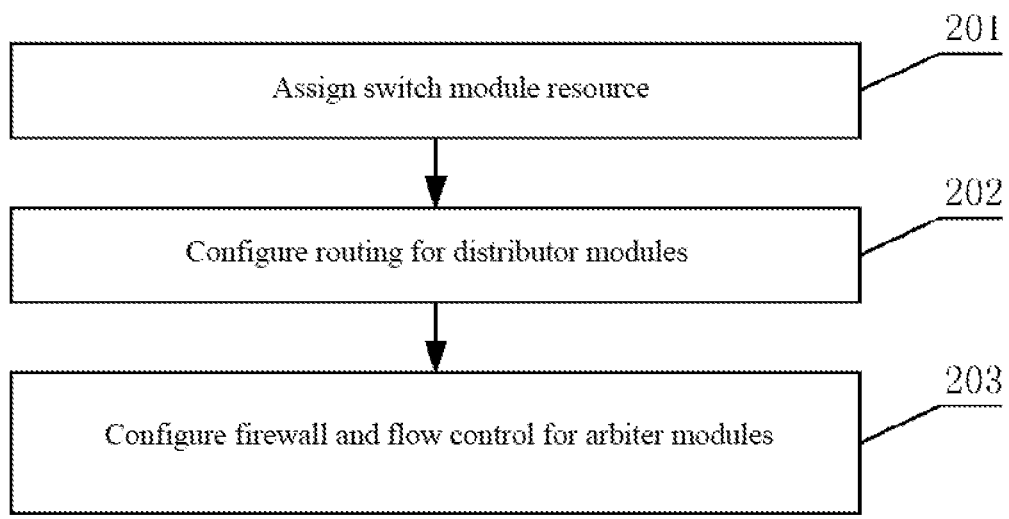
FIG. 2 is a flow chart of the configuration method of the virtualized SoC bus according to the present invention.

FIG. 2 is a flow chart of the configuration method of the virtualized SoC bus according to the present invention. Hereunder the configuration method of the virtualized SoC bus of the present invention will be described in detail with reference to FIG. 2.

First, in step 201, the system switch module resource is assigned for each virtual machine; for example, a virtual machine VM0 uses system switch module MainSwitch0, while virtual machines VM1 and VM2 use system switch module MainSwitch1.

In step 202, the routing of the sending terminal is configured for each distributor module.

In an example of the present invention, the routing of the sending terminal is configured for each distributor according to the status of the virtual machines served by each host. For example, if Host_0 serves VM_0 and the system switch module assigned to VM_0 is SystemSwitchModule_0, the routing of the sending terminal of the distributor module is fixedly configured to SystemSwitchModule_0, and the access from Host_0 to VM_0 will be distributed to SystemSwitchModule_0; if Host_2 serves VM_0 and VM_1 and the system switch modules assigned to VM_0 and VM_1 are SystemSwitchModule_0 and SystemSwitchModule_1 respectively, the routing of the sending terminal of the distributor module is configured to SystemSwitchModule_0 and SystemSwitchModule_1, and the access from Host_2 to VM_0 will be distributed to SystemSwitchModule_0, while the access from Host_2 to VM_1 will be distributed to SystemSwitchModule_1, respectively.

In step 203, the system protection and flow control for each arbiter are set.

In an example of the present invention, the firewall and flow controller of each arbiter is set according to the status of the virtual machines served by each device. For example, if only secure read/write access from VM_0 is permitted; or read/write access from VM_0 and secure write access from VM_1 are permitted, ⅔ bandwidth resource is assigned to VM_0, while the remaining ⅓ bandwidth resource is assigned to VM_1.

In an example of the present invention, the firewall may be set based on the ID of the currently accessing virtual machine, the read write type of the access, whether the access is secure or whether the access is in privileged mode.

In an example of the present invention, the flow controller setting policies include: free of flow control, if the device exclusively belongs to a virtual machine; assigning the bandwidth resource for each virtual machine according to the system settings, if the device is a virtualized device and serves a plurality of virtual machines.

An example of the present invention provides a computer readable storage medium having a program stored thereon, wherein the program can be executed by a processor to perform the steps of the configuration method of the virtualized SoC bus described in any example.

The computer readable storage medium may include: USB-disk, Read-Only Memory (ROM), Random Access Memory (RAM), removable hard disk, diskette, or CD-ROM, and the like that can store program codes.

APPLICATION EXAMPLES

Hereunder the method in the examples of the present invention will be explained clearly and in detail by means of application examples, which are only provided to explain the present invention but are not intended to limit the scope of protection of the present invention.

Figure 3:
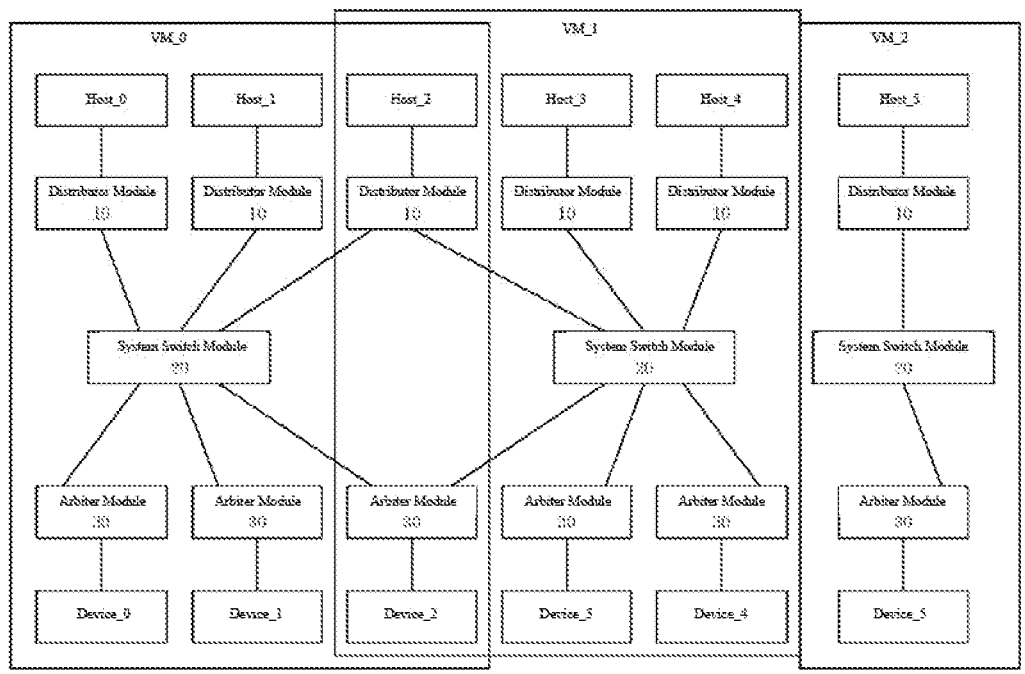
FIG. 3 is a resource allocation diagram of an application example of the virtualized SoC bus system according to the present invention.

FIG. 3 is a resource allocation diagram of an application example of the virtualized SoC bus system according to the present invention. As shown in FIG. 3, the virtualized SoC bus system of the present invention includes six hosts including Host_0 to Host_5 and six devices including Device_0 to Device_5, as shown in the following table.

|  | VM_0 | VM_1 | VM_2 |
|---|---|---|---|
| Host_0 | ✓ |  |  |
| Host_1 | ✓ |  |  |
| Host_2 | ✓ | ✓ |  |
| Host_3 |  | ✓ |  |
| Host_4 |  | ✓ |  |
| Host_5 |  |  | ✓ |
| Device_0 | 100% |  |  |
| Device_1 | 100% |  |  |
| Device_2 | 66% | 34% |  |
| Device_3 |  | 100% |  |
| Device_4 |  | 100% |  |
| Device_5 |  |  | 100% |

According to the above configuration, the access from each host in VM_0 to Device_0/1 is completely unaffected by the behaviors of other virtual machines; at the same time, for the access to shared Device_2, at least 66% of the bandwidth resource can be used by VM_0 since bandwidth control is adopted, and the interference to VM_0 caused by the access of other virtual machines to Device_2 is limited to a predictable range.

The virtualized SoC bus system provided by the present invention realize the virtualization of a plurality of buses of a SoC, and solve the problem of data transmission between virtualized hosts and virtualized devices in a SoC; the data transmission between hosts and virtualized devices is not affected by the behaviors of other virtual machines, thus the stability of the system is improved.

Those skilled in the art should appreciate: the examples described above are only preferred examples of the present invention, and should not be deemed as constituting any limitation to the present invention. Though the present invention is described and illustrated in detail with reference to the above-mentioned examples, those skilled in the art can easily make modifications to the technical solution recorded in the aforementioned examples or make equivalent replacement for some technical features therein. Any modification, equivalent replacement, or improvement made to the examples without departing from the spirit and the principle of the present invention shall be deemed as falling into the scope of protection of the present invention.

The invention claimed is:

1. A non-transitory computer readable storage medium having a program stored thereon, when being executed by a processor, the program causing the processor to:
provide reliable isolation between virtual machines including hosts and devices in a system on chip (SoC) connected through a shared system bus to minimize mutual interference between the virtual machines through a virtualized SoC bus system including a plurality of distributor modules, a plurality of system switch modules, and a plurality of arbiter modules by performing:
assigning each of the plurality of system switch modules to each virtual machine that is respectively identified and associated with different sets of hosts and devices;
configuring routing of output terminals for each of the plurality of distributor modules according to a status of each virtual machine served by each host; and
configuring a firewall and a flow controller for each of the plurality of arbiter modules based on a status of each virtual machine served by each devices;
wherein:
each system switch module includes multiple input terminals and multiple output terminals which are directly connected with corresponding distributor modules and arbiter modules;
each distributor module includes a single input terminal and multiple output terminals, the input terminal of each distributor module is directly connected with a corresponding host, the multiple output terminals of each distributor module are directly connected with corresponding system switch modules, and each distributor module distributes data requests received from the connected host to the connected system switch modules;
each arbiter module includes multiple input terminals and a single output terminal, the multiple input terminals are directly connected with corresponding system switch modules, the output terminal is directly connected with a corresponding device, each arbiter module is configured with corresponding firewall and flow controller and pools the data requests sent by the connected system switch modules to the connected device; and each virtual machine includes one or more hosts, one or more devices, one or more distributor modules directly connected to the one or more hosts respectively, one or more arbiter modules directly connected to the one or more devices respectively, and one system switch module that directly connects between the one or more distributor modules and the one or more arbiter modules.

2. The non-transitory computer readable storage medium having the program stored thereon according to claim 1, wherein:

the step of configuring the firewall further comprises configuring the firewall based on:
an ID of each virtual machine that is accessing the firewall;
read/write type of accessing; and
whether accessing is secure or in a privileged mode.

3. The non-transitory computer readable storage medium having the program stored thereon according to claim 2, wherein the step of configuring the flow controller is made according to a policy set comprising:

in response to the connected device being only associated with one virtual machine, not implementing flow control; and
in response to the connected device being a virtualized device serving a plurality of virtual machines, assigning a bandwidth resource to each of the plurality of virtual machines according to a system setting.

4. Within a system on a chip (SoC), a virtualized bus apparatus, comprising:

a plurality of hosts configured to send data requests;
a plurality of system switch modules configured to connect between a plurality of distributor modules and a plurality of arbiter modules, each system switch module including multiple input terminals and multiple output terminals and configured to analyze and distribute the data requests;
a plurality of distributor modules, each distributor module including a single input terminal and multiple output terminals, the input terminal of each distributor module being directly connected with a corresponding host, the multiple output terminals of each distributor module being directly connected with corresponding system switch modules and
configured to distribute the data requests received from the connected host to the connected system switch modules
a plurality of devices configured to receive the data requests; and
a plurality of arbiter modules, each arbiter module including multiple input terminals and a single output terminal, the multiple input terminal of each arbiter module being directly connected with corresponding system switch modules, the output terminal of each arbiter module being directly connected with a corresponding device, each arbiter module being configured with corresponding firewall and flow controller and pooling the data requests sent by the connected system switch modules to the connected device;
wherein:

the virtualized bus apparatus provides reliable isolation between virtual machines including hosts and devices in the SoC by performing:
assigning each of the plurality of system switch modules to each virtual machine that is respectively identified and associated with different sets of hosts and devices;
configuring routing of output terminals for each of the plurality of distributor modules according to a status of each virtual machine served by each host; and
configuring a firewall and a flow controller for each of the plurality of arbiter modules based on a status of each virtual machine served by each device; and each virtual machine includes one or more hosts, one or more devices, one or more distributor modules directly connected to the one or more hosts respectively, one or more arbiter modules directly connected to the one or more devices respectively, and one system switch module that directly connects between the one or more distributor modules and the one or more arbiter modules.

5. The apparatus according to claim 4, wherein distributing the data requests received from the connected host to the connected system switch modules comprising:

in response to the connected host being only associated with one virtual machine, distributing the data requests to one system switch module;
in response to the connected host being a virtualized host serving a plurality of virtual machines, distributing each of the data requests to a respective system switch module based on a virtual machine ID of each of the data requests.

6. The apparatus according to claim 5, wherein each distributor module maintains data consistency amongst the data requests when the data requests are distributed to more than one second system switch module.

7. The apparatus according to claim 5, wherein each arbiter module further comprises:

a firewall configured to minimize mutual interference between the virtual machines based on a criteria comprising:
an ID of each virtual machine that is accessing the firewall;
read/write type of accessing; and
whether accessing is secure or in a privileged mode.

8. The apparatus according to claim 4, wherein the flow controller configured to implement at least a policy set comprising:

in response to the connected device being only associated with one virtual machine, not implementing flow control; and
in response to the connected device being a virtualized device serving a plurality of virtual machines, assigning a bandwidth resource to each of the plurality of virtual machines according to a system setting.

9. A method of configuring a virtualized system on chip (SoC) bus system comprising:

providing reliable isolation between virtual machines including hosts and devices in a system on chip (SoC) connected through a shared system bus to minimize mutual interference between the virtual machines through the virtualized SoC bus system including a plurality of distributor modules, a plurality of system switch modules, and a plurality of arbiter modules by performing:

assigning each of the plurality of system switch modules to each virtual machine that is respectively identified and associated with different sets of hosts and devices;

configuring routing of output terminals for each of the plurality of distributor modules according to a status of each virtual machine served by each host; and configuring a firewall and a flow controller for each of the plurality of arbiter modules based on a status of each virtual machine served by each a device;

wherein:

each system switch module includes multiple input terminals and multiple output terminals which are directly connected with corresponding distributor modules and arbiter modules;

each distributor module includes a single input terminal and multiple output terminals, the input terminal of each distributor module is directly connected with a corresponding host, the multiple output terminals of each distributor module are directly connected with corresponding system switch modules, and each distributor module distributes data requests received from the connected host to the connected system switch modules;

each arbiter module includes multiple input terminals and a single output terminal, the multiple input terminals are directly connected with corresponding system switch modules, the output terminal is directly connected with a corresponding device, each arbiter module is configured with corresponding firewall and flow controller and pools the data requests sent by the connected system switch modules to the connected device; and each virtual machine includes one or more hosts, one or more devices, one or more distributor modules directly connected to the one or more hosts respectively, one or more arbiter modules directly connected to the one or more devices respectively, and one system switch module that directly connects between the one or more distributor modules and the one or more arbiter modules.

10. The method according to claim 9, wherein the step of configuring the firewall further comprises configuring the firewall based on:

an ID of each virtual machine that is accessing the firewall;

read/write type of accessing; and whether accessing is secure or in a privileged mode.

11. The method according to claim 9, wherein the step of configuring the flow controller is made according to a policy set comprising:

in response to the connected device being only associated with one virtual machine, not implementing flow control; and in response to the connected device being a virtualized device serving a plurality of virtual machines, assigning a first bandwidth resource to each of the plurality of virtual machines according to a system setting.

* * * * *